United States Patent [19]

Othmer

[11] 3,853,541

[45] Dec. 10, 1974

[54] METHOD FOR PRODUCING ALUMINUM METAL DIRECTLY FROM ORE

[76] Inventor: Donald F. Othmer, 333 Jay St., Brooklyn, N.Y. 11201

[22] Filed: Nov. 20, 1972

[21] Appl. No.: 308,059

Related U.S. Application Data

[63] Continuation-in-part of Ser. No. 103,765, Jan. 4, 1971.

[52] U.S. Cl. .............. 75/68 B, 423/135, 423/136, 423/149, 423/76
[51] Int. Cl. .............................................. C22b 21/00
[58] Field of Search .............. 75/68 B, 112, 113; 423/135, 136, 149, 76

[56] References Cited
UNITED STATES PATENTS

| | | | |
|---|---|---|---|
| 1,866,731 | 7/1932 | Starl | 423/136 |
| 1,987,629 | 1/1935 | Miner | 75/72 |
| 3,186,832 | 6/1965 | Sparwald | 75/68 |
| 3,244,509 | 4/1966 | Nowak et al | 75/29 |
| 3,466,169 | 9/1969 | Nowak et al | 75/112 |

FOREIGN PATENTS OR APPLICATIONS

| | | | |
|---|---|---|---|
| 1,019,261 | 1/1953 | France | 75/68 B |
| 734,480 | 8/1955 | Great Britain | 75/68 B |
| 261,162 | 8/1949 | Switzerland | 75/68 B |

*Primary Examiner*—Herbert T. Carter

[57] ABSTRACT

Aluminum is separated from aluminous ores, hitherto considered unusable, through tri-halide - sub-halide conversions. Aluminum oxide is halogenated to a volatile tri-halide. This is converted above 1000°C, and preferably at 1500°–1800°C, with additional aluminum from the ore, to give a hot gas stream containing three moles of mono-halide. By cooling this gas stream in not more than 1 to 5 seconds, the mono-halide reverts to one mole of tri-halide and two atoms of pure metallic aluminum. The flash cooling uses direct contact with a liquid halide of aluminum or a liquid solution of a halide of aluminum and a volatile or a relatively non-volatile halide of a metal above aluminum in the halide affinity series.

25 Claims, No Drawings

METHOD FOR PRODUCING ALUMINUM METAL DIRECTLY FROM ORE

This application is a continuation in Part of copending Application, U.S. Ser. No. 103,765, of Jan. 4, 1971. Pure aluminum may be produced directly by this invention from various alumina-containing ores, including bauxites, clays, shales (including oil shales), slates, feldspars, and others, also wastes from other operations - as red muds from Bayer processing to produce alumina, slimes from phosphate rock beneficiation, etc. These ores and residuals, because of their large content of other metal oxides and the chemical nature of the compounds of these oxides with each other and with alumina, are unsuitable for production of aluminum by the usual attack by caustic soda in the Bayer process which gives alumina for electrolysis to the metal by the Hall process. Instead, halogens, and particularly chlorine and bromine, are used to attack the aluminous material. The corresponding volatile halides which are formed of aluminum and other metals are separated; and substantially pure aluminum metal is produced therefrom by a thermal operation involving disproportionation of the aluminum halide. Other pure metallic compounds or metals are obtained by other steps.

Hereinafter, the more common chlorine, chlorination, and chlorides are usually referred to with the understanding that bromine, bromination, and bromides, also fluorine, fluorination, and fluorides, may be often considered as equivalent for the processes concerned, and with some relative advantages and disadvantages in different cases.

Chemical Reactions Used in Related Prior Art 1

When an aluminum-containing ore is chlorinated by processes of the prior art and as described in Copending Application U.S. Ser. No. 103,765 of Jan. 4, 1971, those elements, including particularly iron and titanium, but also vanadium, phosphorous, sulfur and those metals which have a greater affinity for chlorine from the oxide than does aluminum, may be chlorinated first. The chlorides which are volatile are removed first. The non-volatile chlorides remain in the gangue. The alumina may next be chlorinated in the presence of carbon to give the normal chloride, $AlCl_3$, which is volatilized off as a practically pure gas, with evolution of heat: -

$$Al_2O_3 + 3C + 3Cl_2 \longrightarrow 2AlCl_3(gas) + 3CO + Heat \quad (1)$$

These steps may resemble the usual fractional distillation of compounds of greater volatility (lower boiling point) away from those of lesser volatility in a succession of steps. Here, instead of volatility alone, the additional property of the affinity of a metal to form the chloride from its oxide is important.

The aluminum atom is normally trivalent, but changes to mono-valency or disproportionating at temperatures higher than about 1000°C; and at these temperatures, AlCl is the stable chloride. Thus, when $AlCl_3$ gas is heated to temperatures of 1100–1800°C, twice as much more aluminum may be reacted with the three chlorine atoms of the molecule to give the monochloride.

$$AlCl_3(gas) + 2Al(solid) + Heat \rightleftharpoons 3AlCl(gas) \quad (2)$$

If heat is supplied, this reversible reaction is known to go from left to right, above about 1,000°C, and is reversed to go from right to left below about 1,000°C, with heat being given off. Hence, by cooling the AlCl vapor below 1,000°C, the aluminum again assumes its usual tri-valency; and the reaction liberates pure aluminum metal as a liquid above its melting point of 660°C, or as a solid if cooled below this temperature. By operating the cooler-condenser at about 700°C, the pure liquid aluminum formed may flow into molds and solidify as ingots.

The normal aluminum chloride, $AlCl_3$, resulting here after loss of aluminum, has again been reacted in the prior art with additional metallic aluminum, usually by contacting pieces of an aluminum-iron alloy. The process is repeated, with two atoms of chlorine acting as the carrier to chlorinate two atoms of aluminum from a source of the metal at the higher temperature; and the reverse or disproportionation from mono-valent to tri-valent aluminum at the lower temperature accomplishes the separation at the lower temperature of two-thirds of the aluminum present in the three moleculses of AlCl.

While these reactions have long been known in the art, there have been major problems in commercializing processes using them with the pieces of aluminum-iron alloy, which must, in any case, be prepared from ores by prior extensive and expensive processes.

Also, the reaction gives a much higher yield of the sub-halide by Equation 2 at higher temperatures, preferably 1500°–1800°c; and the velocity of the reaction increases very greatly with increased temperature.

Chemical Reactions Used in the Present Invention

At the high temperature of 1,100°–1800°C and preferably above 1500°C, at least three gaseous chlorinating agents may be used in the reduction-chlorination of $Al_2O_3$ to give the monochloride AlCl directly in the attack on the ore itself. These are: (a) both atoms in the molecule of chlorine, $Cl_2$ itself; (b) all of the chlorine atoms present in some other gaseous metallic chloride, of an element lower in the affinity series, as $SiCl_4$; or (c) two of the chlorine atoms present in $AlCl_3$. Any of these give chlorine to produce AlCl by reaction with aluminum, taken not from a source of metallic aluminum as in Equation 2, but instead directly from the oxide $Al_2O_3$ through this reductionchlorination. Thus:

$$Cl_2 + Al_2O_3 + 3C \longrightarrow 2AlCl + 3CO \quad (3a)$$

$$SiCl_4 + 2Al_2O_3 + 4C \longrightarrow 4AlCl + 4CO + SiO_2 \quad (3b)$$

$$AlCl_3 + Al_2O_3 + 3C \longrightarrow 3AlCl + 3CO \quad (3c)$$

The above reactions use coke sufficient for the reductionchlorination and also to burn with oxygen to supply any additional heat required, e.g., $C + O_2 \rightarrow CO_2$ - - - or - - - $C + \frac{1}{2}O_2 \rightarrow CO$.

Considering the heat given up by the reactions themselves, that required to bring the reactants up to 1100–1800°C and that required to maintain the furnace at this high temperature, there may be required additional heat. This amount will depend upon:

(a). the ore used and therefore the composition of the solids being treated by the gaseous chlorination agent in the reacton zone;

(b). the relative amounts of $Cl_2$, $SiCl_4$, and $AlCl_2$ which are used in the reduction-chlorination since there are different amounts of heats required with the different chlorinating agents in the respective reactions 3a, 3b, and 3c;

(c.) the type of furnace used and therefore the amount of heat lost to the surroundings.

Thus, the two aluminum atoms necessary for the reaction of Equation 2 can be taken not only from metallic aluminum as in Equation 2, but also from aluminum oxide in the presence of carbon with the formation of CO. The present invention thus uses Equation 3c principally, but also 3b, and in other cases 3a, to attack the ore, and then Equation 2 (right to left) to produce pure aluminum directly from the alumina in the ore.

The careful addition of chlorine and of oxygen, preferably as such (although air may be used less advantageously) so that the correct stoichiometric amounts are not exceeded, is the most essential control of the invention. Neither of these reactive gases can be present when metallic aluminum is obtained in cooling its mono-chloride down from above 1,000°C to some temperature below 700°C, or the metal is instantly oxidized or chlorinated. Hence, in the operation of the reactions represented by Equations 3a, 3b and 3c, there must always be present an excess of alumina.

The oxygen to combust the coke added for the supply of heat in the mixture of ore and reductant to maintain the high temperature of 1100–1800°C will be added to this reaction zone. This may be done in admixture with the chlorine, and through the chlorine feed line or, as suggested hereinafter, it may be through a separate inlet. In either case, the control is based on the temperature of the reaction zone wherein Equation 3a, 3b or 3c takes place; if the temperature falls, more oxygen is added; if it rises too high, the supply of oxygen is throttled.

In use of coke for heat and in the chlorination, more or less $CO_2$ is formed; but the corresponding equations are not written here for this obvious modification.

The gaseous $AlCl_3$, which is uncondensed in the condenser for the metallic aluminum, may then be passed to contact the raw ore feed in an oxidation-chlorination, to remove the iron present as $FeCl_3$ in a first step, while giving the Al from the $AlCl_3$ as the oxide $Al_2O_3$.

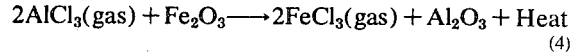

$$2AlCl_3(gas) + Fe_2O_3 \rightarrow 2FeCl_3(gas) + Al_2O_3 + Heat \quad (4)$$

This $Al_2O_3$ then returns with the $Al_2O_3$ and the other solids of the feed to the reduction-chlorination, where it undergoes again the reaction of Equation 1; the $AlCl_3$ formed undergoes the reaction of Equation 3c; and the AlCl so formed undergoes the reaction of Equation 2 (right to left) to give more aluminum. A cycle is thus formed of the reactions of $AlCl_3$.

There may be more iron in the ore than can be removed according to Equation 4 by the amount of $AlCl_3$ available which, on the basis of the number of atoms of aluminum metal removed in Equation 2 (right to left) is 1 to 2. Thus, if more than one-half as many atoms of iron are in the ore as atoms of aluminum, the $AlCl_3$ of Equation 4 does not supply sufficient chlorine to make $FeCl_3$ of all of the $Fe_2O_3$ present. Additional chlorine as $Cl_2$ is supplied then to remove all iron as $FeCl_3$, which may then be burned with $O_2$ to recover $Fe_2O_3$ and reduced with $H_2$ to Fe.

The attack of almost any aluminum ore by a reduction chlorination is such that aluminum may be removed as $AlCl_3$ almost quantitatively at temperatures of 750°C to 900°C, or as AlCl at temperatures from 1,000°C to 1,800°C, suitably 1500°–1,800°C. These ores include various clays, shales, and other minerals widely distributed and of little present value, as well as the bauxites normally used for the production of aluminum by attack with caustic soda in the Bayer process. In these ores, entirely non-usable by the conventional process, the presence of $SiO_2$ and particularly its association with $Al_2O_3$ makes difficult and expensive the normal attack with caustic soda and the accompanying loss of this aqueous alkaline reagent. Using chlorine, no reagent is tied up in residues containing aluminum or silicon, as in conventional processing.

The preliminary handling of the ore and the coke to be used requires their preparation to give a range of particle sizes preferably of 60 to 200μ, although larger sizes may also be used up to 3 mm, with corresponding reduction ofspeed of the reactions. These pulverent or particulate masses must be thoroughly dried at a temperature high enough to drive off all free and as much as possible of any combined water. Water added to the system unites with the chlorine present to give hydrogen chloride which may be a waste of chlorine and a nuisance in the operation. Intimate mixing of the ore and coke is necessary in their pulverent particulare forms. Either term here includes this range of sizes.

The chemical reactions (except that for aluminum metal from AlCl) are accomplished as described in U.S. application Ser. No. 103,765 of Jan. 4, 1971 by the gaseous interaction with pulverent solids; and each reaction has been found to go very fast because of the small size of the solid particles, and hence the large ratio of surface for reaction, to mass to be reacted. Furthermore, these reactions are chlorinations by chlorine gas or by a gaseous metallic chloride of a metal whose oxide has less affinity for the chlorine; and they always result in the formation of a gaseous chloride which is removed from the reaction scene by its volatility, or of a non-volatile chloride which stays with the gangue. Higher temperatures cause reactions to go faster, thus while the reactions of Equations 3a, 3b and 3c operate above 1000°C, they go much faster at 1,500°, which may often be the optimum because of problems with materials of construction. However, even higher temperatures, over 1,500°C and up to at least 1,800°C, have been found advantageous in speeding up and completing the reaction.

FUNCTIONS OF $AlCl_3$

Since in the present invention $AlCl_3$ is both a product and a raw material according to Equations 1, 2, 3c and 4, the relative amounts of $AlCl_3$ used in each reaction, and particularly in Equation 4, depends on the amount of $Fe_2O_3$ and some other constituents in the ore, e.g., phosphorus and vanadium, as well as other metals higher than Al in the chlorine affinity series. Hence, the controls of flow of ore, reductant, and chlorine, as well as of temperatures in the reactions, fix the amount of $Al_2O_3$ recycled back from the chlorination step which removes the iron as $FeCl_3$.

If all aluminum entering in the ore ultimately leaves the system by Equation 2 (right to left); one-half as much more aluminum as enters the system must be in the $AlCl_3$ formed; and this is recycling around and around to form more aluminum metal. This $AlCl_3$ may be condensed physically and returned as a solid for recycle to form more AlCl; or it may be condensed chemically by reacting with metals above aluminum in the chloride affinity series. One such reaction is with $Fe_2O_3$ to vaporize the iron as $FeCl_3$ while giving $Al_2O_3$, according to Equation 4. Thus, if the ore contains one-half as many moles of $Fe_2O_3$ or a chemical equivalent thereof of other metal higher in the chlorine affinity series as of $Al_2O_3$, the $AlCl_3$ coming from the condenser for the aluminum, after leaving twice as much aluminum metal there (equivalent to all that enters in the ore) could all be used in the reaction of Equation 4 to remove the higher metal from the system as the chloride - in the case of Fe as the volatile chloride. (However, this $AlCl_3$ used to form $FeCl_3$ which volatilizes, and the $Al_2O_3$ which remains in the system are not net users of chlorine.)

If more than half as many atoms of iron (or equivalent of higher metals) as of aluminum are in the ore, then additional $AlCl_3$ may be recycled as a gas to displace and remove the iron or additional chlorine as $Cl_2$ may be added. If the ore contains less than half as many atoms of iron as of aluminum, the heat in the vapors may be recovered by condensing $AlCl_3$ (gas) physically to preheat the ore charged insofar as possible. Or the $AlCl_3$ may be condensed with loss of its latent heat of condensation and returned to the feed solids. These and other examples of working with ores of different concentration of different oxides are described in Co-pending Application, Ser. No. 103,765 of Jan. 4, 1971.

However, it is notable that, since the aluminum leaves the system as the metal, there is no net requirement of chlorine for its separation; the $AlCl_3$ simply recycles as a carrier again and again in picking up aluminum from the ore to discharge it as aluminum metal.

In the condensation of $AlCl_3$ at 180.6°C, only solid is produced, since this, the sublimation temperature, is at a lower pressure and temperature than the triple point. Condensers for handling the solids are widely used in the manufacture of $AlCl_3$ and any conventional one may be used here. However, aluminum and $AlCl_3$ can be solidified together advantageously by instantaneously cooling the vapors to 180°C. If $AlCl_3$ can be maintained in a liquid state, a spray or "splash" condenser can be used. Methods of accomplishing this are an important part of this invention.

OBJECTS OF THE PRESENT INVENTION

Some of the objects and accomplishments of this invention are:

a. the economical winning of aluminum from many ores and residues of ores which cannot be used to produce alumina by the Bayer process, and without the large chemical costs lof the Bayer process;

b. the production of aluminum without the large electric power costs of electrolyzing alumina by the Hall process;

c. the use of halogens under appropriate conditions to attack the aluminous material and to allow the separation of other metallic values in commercial form with the separation of substantially all of the aluminum present as high quality metal;

d. the production of aluminum sub-halide in a hot gas stream and its disproportionation to give aluminum metal during a flash cooling;

e. the use of the aluminum tri-halide as a direct contact cooling fluid for the hot gases in the flash-cooling to accomplish the disproportionation;

f. the operation of the disproportionation with boiling aluminum tri-halide as the coolant at atmospheric pressure and substantially its mormal boiling point;

g. the operation of the disproportionation using as a liquid coolant the aluminum trihalide formed therein, which has no liquid phase under one atmospheric pressure, but which is:
   i. operating at a pressure above its triple point so that a liquid phase can be formed to be used in the flash cooler,
   ii. forming a mixed salt solution of the aluminum trihalide with an added halide salt of another metal which is above aluminum in the halogen affinity series and thus keeping the aluminum trihalide in a liquid phase which may have a boiling point, when used in the flash cooler, which is chosen to be either above or below the sublimation point of the aluminum trihalide;

h. the use of a coolant liquid comprising aluminum tri-halide as a solvent for the aluminum sub-halide during its disproportionation;

i. the removal of the heat given up by the hot gases during their cooling and the disproportionation as latent heat of evaporation of the coolant and as latent heat of condensation in a second or reflux condenser;

j. the separation of substantially pure aluminum metal produced in the disproportionation from the coolant.

FLASH COOLING AND CONDENSATION

A chemical reaction, particularly if homogeneous in the gas phase, may give at a high temperature the maximum yield of a desired product. However, this may decompose if kept at this high temperature; or, even if all reactants are stable, the high yield may be lost in the large part on cooling due to the occurrence of reverse or other reactions at a lower temperature. A preferred system of overcoming this is by instantaneous or flash cooling of the gases including condensation of any vapors present. Many types of equipment have been devised and used, often these provide direct and intimate contact with a very much colder liquid.

In the reversible gaseous reaction of Equation 2, first of subchloride formation, then of aluminum production therefrom, when this is combined with or follows the reduction-chlorination of $Al_2O_3$ (Equation 3) the CO - also $CO_2$, $O_2$, or $Cl_2$, if present will unite with the Al metal formed on cooling to give the carbide, the oxide, and/or the chloride, and thus will defeat the production of Al.

Flash cooling the reactants has been suggested to maximize the amount of Al recovered by cooling rapidly the reactants and thus quenching the reaction at the appropriate time and temperature to secure the same maximum yield of Al as at the high temperature. This is done by contacting the hot gases with a liquid coolant in some form of dispersed flow. For example, a spray of droplets of liquid Al has been used in direct contact with the hot reactants in a condenser at about 700°C - just above the melting point of Al metal, and considerably below the optimum reaction temperature of the gases of 1,500°C to 1,800°C. The heat is removed from the molten Al by a heat exchanger, to be passed to a fluid at a lower temperature. The heat exchanger may be integral with or separated from the flash condenser.

The droplets may be formed by an agitator rotating rapidly and partially submerged in liquid Al at 700°C; and the unit is then called a "splash" condenser. Alternatively, it may have a spray of the cooling liquid forced through a jet by a pump. The pump is more difficult to maintain than the open agitator when working with a liquid which freezes at ambient temperature. These conventional splash, spray, or other type of direct contact condensers for flash cooling are well known; and their designs are not a part of this invention. Still another processing, described hereinafter, contacts the hot gases with films of liquid coolant, descending-as over the packing shapes in a distilling column.

The extremely large surface are of droplets of liquid Al used in these flash condensers give an excellent heat transfer surface for cooling the several known variations of this device; however, at this temperature of 700°C a very large surface area of Al is presented which is many times that of the surface of the Al condensing out for the first time. It has been found that the Al, so exposed with this large surface area, reacts at any temperature at which it is liquid with the CO, $CO_2$, $O_2$, or $Cl_2$ in the gas stream to give the oxide, carbide, or chloride. These reactions greatly reduce the net production of Al.

$AlCl_3$ as Coolant Liquid

Now it has been found that liquid $AlCl_3$, either alone or in combination with another metal halide in the liquid phase, is better than molten Al or any other material as the direct coolant liquid in dispersed flow, spray, film, etc. to "quench" the reaction from the temperature at which a maximum of the sub-halide is present in the gas phase - 1,000° to 1,800°C and preferably above 1,500°C. Furthermore, the heat removal may be as latent heat in a boiling operation rather than as sensible heat to a cooler fluid, which offers some advantages in design and operation.

In evaluating the allowable time for this cooling in order to prevent the backward or side reaction, it has been found that the maximum Al production is accomplished when the time is not more than about 5 seconds, and preferably not more than about 1 second in reducing the temperature of the hot gas stream to 700°C or less. $AlCl_3$, which sublimes at about 180°C has many advantages as the direct contact coolant for this purpose; but it cannot be used by itself at atmospheric pressure because it condenses as a solid, and, as such, does not lend itself to a spray or other system using a dispersed condensed phase. However, $AlCl_3$ may be used as a liquid in a flash condenser operated at a temperature and vapor pressure above its triple point of 192.6°C and 2.2 atmospheres: - e.g., at 220°C the vapor pressure of liquid $AlCl_3$ is about 3.5 atmospheres.

Thus, by operating the condensation-cooler for the removal of the Al formed in the disproporationation under pressure, $AlCl_3$ may be used as the coolant for removing the heat in the vapors from the several sources. This imposes a major difficulty in that the disproportionation also must be operated under pressure in order that the hot gases therefrom can be passed immediately to the cooler. By itself, this then operates with kinetic advantage due to diminished volume in that (aside from the non-condensible gas volumes which are not a part of the reaction) 3 volumes of AlCl give 1 volume of $AlCl_3$ (plus a negligible volume of Al metal).

The chlorination may also be operated under pressure in supplying this hot gas stream. If pure $AlCl_3$ vapors act as the chlorinating agent (Equation 3c) and are passed from a pressurized boiler to a pressurized reaction chamber for $AlCl_3$, $Al_2O_3$ and coke held at 1,000° to 1,800°C, preferably 1,500° to 1,800°C, to give AlCl, the kinetics of the chlorination are somewhat less advantageous when accomplished under increased pressure because of the change of one gas volume to four gas volumes. Similarly, chlorinations with either chlorine gas (Equation 3a) or $SiCl_4$ (Equation 3b) shown an increase in volume. However, the use of liquid $AlCl_3$ as the coolant is distinctly advantageous, and with the advantage to the kinetics of the disproportionating step, this may balance, in some cases, the disadvantages of the increased volume in the step of chlorination to the sub-halide.

$AlBr_3$ as Coolant Liquid

It has also been found that, if bromine is used as the halogen in the process, the $AlBr_3$ formed may then be converted to AlBr, and by disproportionation of this AlBr, $AlBr_3$ is formed again along with Al metal. The $AlBr_3$ coolant liquid which is used melts at 97°C and boils under one atmosphere pressure at 263°C. It can be used as in a liquid spray condenser or other flash condenser operating at atmospheric pressure in direct contact with dispersed liquid $AlBr_3$. Thus, by using $AlBr_3$ at this normal boiling point, a spray of liquid drops cools the hot mixed gases containing AlBr and CO which comes from the high temperature zone where the sub-bromide, AlBr, is formed by the reduction-bromination of $Al_2O_3$. The AlBr disproportionates to $AlBr_3$ and Al metal, either before or after dissolving in the liquid $AlBr_3$, wherein the disproportionation can take place out of contact with the undesirable non-condensible gases. The Al metal freezes on the sudden cooling so far below its melting point.

The very large amount of heat given up is readily absorbed as latent heat by the $AlBr_3$ which boils; and the vapors are condensed in what amounts to a reflux condenser. The noncondensibles pass through the condenser to be vented. A duct of minimum length and diameter carries the hot gases from the reaction to the flash condenser so that the time is minimized to cool the AlBr in the gas stream from its advantageous equilibrium at the high temperature of 1,000°C, or preferably 1,500°C, to 1,800°C down to the normal boiling temperature of $AlBr_3$ - 263°C. Desirably this time of cooling of the hot gases should be within less than 5 seconds; and the best yields of the product Al are obtained when this time is less than 1 second.

The hot gases from the reactor may dishcarge immediately into a chamber below the reflux condenser so that the condensate therefrom falls as droplets or films down and over packing shapes to give an extensive cooling-contacting surface for the relatively much lower temperature liquid with the hot gases.

The aluminum crystallizes to a powder which makes a slurry in the liquid salt. The slurry may be heated below the condenser zone to evaporate the $AlBr_3$ therefrom. A heavy sludge of Al in $AlBr_3$ is withdrawn and further heated so as to dry the metal particles completely, thus giving $AlBr_3$ vapors which are passed back to the same reflux condenser. The heating is continued to melt the aluminum for casting into slabs.

$AlBr_3$ may be regarded as the simplest of the halide salts or solutions for the coolant liquid; and as it is typical in some of the operations involved, these may be considered. The non-condensible gases (CO, $CO_2$, $O_2$, $Cl_2$, etc.) which may be present must be cooled as well as the condensibles:- Al, AlBr, and $AlBr_3$. However, the dissolution of the AlBr in the $AlBr_3$ coolant, before the AlBr can disproportionate, prevents the Al metal formed from contact with and interaction with the non-condensible gases; and furthermore, the AlBr liquid immediately coats the fine particles of Al formed and prevents contact, and hence interaction with the non-condensible gases. Finally, the undesired reactions at the low temperature which are obtained and maintained by the instantaneous boiling of the $AlBr_3$ in the excellent heat transfer relation are very much less effective in reducing the yield of product Al than at the melting point of Al, 660°C or somewhat above (690°-700°C).

Furthermore, the amount of $AlBr_3$ condensed in the reflux condenser may be controlled to be equivalent to that used as the cooling liquid - and the lesser amount which came from the hot gases from the reactor may be uncondensed and forced by a suitable blower back to the reactor to contact and brominate the $Al_2O_3$ in further amounts of the ore supplied later.

Bromine costs several times as much as chlorine. However, no Br is expended in the aluminum cycle; and if that which also cycles with the other elements with which it combines in the ore is entirely recovered, the cost is merely that of the inventory in the operation, and this would be unimportant. In no case can there be more than a negligible loss from the operations to the surroundings because of the nuisance of the halogens, even in relatively small quantities. Some other advantages also accrue in using Br because it is more easily recovered from off-gases, i.e., Br, HBr, and $AlBr_3$ are all less volatile than the respective chlorine compounds, and $AlBr_3$ may be used as a liquid at atmospheric pressure while $AlCl_3$ cannot, since it sublimes and condenses as a solid under atmospheric pressure.

Solutions of $AlCl_3$ with Chlorides of Metals Higher than Al in the Affinity Series Other liquids have been found useful in conjunction with $AlCl_3$ for the direct contact cooling and condensing at atmospheric pressure by direct contact dispersed liquid, with the hot gas mixture containing Al subchloride. These maintain the $AlCl_3$ in a liquid phase and effectively reduce its vapor pressure so that it vaporizes at a temperature above its normal sublimation temperature of 180°C. Particularly useful are solutions of the chemically combined chlorides and of various physical mixtures of $AlCl_3$ with the chlorides of alkali and alkaline earth metals, LiCl, KCl, NaCl, $CaCl_2$, and $MgCl_2$; also of chlorides of other metals which are also higher than chlorine in the chlorine affinity series.

The halogen or chlorine affinity series of metals as mentioned above lists the order of the reactivity of their oxides for chlorine and has been developed by Othmer and Nowak (A.I.Ch.E.Journal, vol. 18, No.1, p.217) at two temperatures for a dozen metals. In order to understand better the relation of the halogenation processes utilized herein, and particularly the relation of the chlorides to each other and to their usefulness in this step, the order or position of a much larger number (31) of the elements has now been determined in the chlorine affinity series. This position changes with temperature in some cases, and the values were determined at 100°C intervals between 700 and 1800°C.

At the temperature of 1,000°C, the order decreases as follows:

K, Na, Li, Ag, Hg, Ca, Pb, Cu, Cd, Zn, Bi, Sb, Mn, As, H, Ni, Co, Sn, Mg, Fe, Cr, Ti, Zr, Al, Be, Si, B, Mo, W, P, C. Thus, the chloride of any metal will lose its chlorine to the oxide of any preceeding metal while taking the oxygen therefrom.

Similarly, at 1,000°, the bromine affinity order as determined for 16 elements was found to decrease as follows:

K, Na, Hg, Li, Pb, H, Mg, Fe, Ti, Zr, Al, W, Be, B, P, C.

Mixed salts are formed of many of the chlorides of other metals with $AlCl_3$. However, these solutions also may be regarded as simply binary (or ternary or even quaternary) liquid mixtures over wide ranges of the ratios of $AlCl_3$ to that of the chloride of the other metal or of the chlorides of two or more such metals in a molten solution. In almost every case, some ratio of salts in these chemical or physical mixtures will give the $AlCl_2$ dissolved in a liquid phase at atmospheric pressure and at a suitable operating temperature for a splash condenser, i.e., between 100°C and 500°C; or even as high as 700°C to 725°C, when it is desired to use a flash condenser which gives the Al as a liquid.

Hence, these liquid mixtures of metal chlorides may be used as the liquid in a direct contact spray or splash condenser, as the direct contact heat transfer agent; but the mixture may be selected to boil to give a high concentration of $AlCl_3$ in the vapors if desired. For example, the boiling points of the chlorides of the alkali and alkaline earth metals are high and their relative volatilities out of solutions with $AlCl_3$ are low, up to about 700°C–725°C, which is above 660°C, the melting point of Al, and thus gives molten Al to be withdrawn as such. This is about the highest desirable temperature range for the flash condensation. However, pure $AlCl_3$ vapors give a solid condensate in the reflux condenser. Thus, the choice of salt mixture must be one of the vapors of which give a condensate which is fluid at the temperature of the condenser.

Some of these solutions of mixed salts have been used in the prior art as heat transfer agents with pure Al metal as the direct contact heat transfer agent. Two tubular heat exchangers have been used in addition, one to withdraw heat from the liquid Al into the mixed salt liquid which is not in contact with the vapors, and one to discharge this heat to coolilng water which also is not in contact with the mixed salt liquid. This is a distinctly different usage and process than that of the present invention where the salt or salt mixture in dispersed flow contacts and cools the hot gases directly.

Now it has been found that the liquid solutions of $AlCl_3$ in chlorines of the alkaline and alkaline earth metals may be used instead of the priorly used molten Al metal in spray or splash condensers to condense $AlCl_3$ instantly by direct contact of the hot gases coming from the reactor with this colder liquid phase, and to condense metallic Al as a liquid and to freeze it if desired. Both the Al and the $AlCl_3$ come from the disproportionating of the Al sub-chloride. Non-condensible gases – CO, $CO_2$, $O_2$, or $Cl_2$ pass on without time or opportunity to contact and to unite with the Al which is formed and immediately are covered with a film of the molten salts in which these gases are insoluble. Some part of the chemical reaction of Equation 2, left to right, may indeed be accomplished in this liquid phase after the AlCl is dissolved therein. Considerable heat must be removed from the gaseous mixture due to: - (a) the endothermic chemical reaction of disproportionation; (b) the condensation of Al; (c) the freezing of Al; and (d) the considerable sensible heat to cool $AlCl_4$ and all of the CO and other gases which cannot be condensed. All of this heat taken up by this mixture of the chlorides of Al and one or more alkaline or alkaline earth metals is used to supply latent heat to boil at least one of the salts of the mixture itself. This will usually mean principally the evaporation of $AlCl_3$ because of the low relative volatility of the other chloride of a binary mix if chosen from those of the alkali or alkaline earth metals.

Here again, it is desirable in some operations to condense in the reflux condenser all of the added salt or salts when they have a higher boiling point than that which $AlCl_3$ sublimes together with only an equivalent amount of $AlCl_3$ to balance the cooling load in the flash condenser. An amount of $AlCl_3$ equivalent to that used in the reactor itself may be allowed, by careful control, to pass uncondensed along with the noncondensible gas for recycle back to the reactor itself. Usually the requirement that the non-condensible gases be separated and vented requires the condensation of all of the $AlCl_3$.

It has thus been found that the boiling points of these binary, ternary, or quaternary liquid mixtures of $AlCl_3$ and chlorides of the alkali or alkaline earth metals may be varied over a range from the sublimation point of pure $AlCl_3$, 180°C, (and $AlCl_3.NaCl$ melts at this temperature) to above the melting point of Al metal - so Al may be recovered in the liquid form if desired. The $AlCl_3$ vaporizes due to the large heat input to these solutions of mixed salts and the vapors pass to the reflux condenser. There may be comparatively little of the companion alkali or alkaline earth metal chloride or chlorides vaporized because of their comparatively low relative volatility, but the condensate of both are returned from the reflux condenser to the flash condenser.

In some cases, a sufficiently high temperature of boiling of the halide salt mixture in the flash condenser is desired, approximately 700°C–725°C, so that aluminum may be withdrawn as a liquid, above its melting point of 660°C. Then a very small amount of rectification of the mixed chloride salt vapors leaving the splash condenser will hold down the chloride or chlorides of the alkaline or alkaline earth metal and allow only $AlCl_3$ vapors to pass through. These are then, in part, passed back to the reactor system to chlorinate $Al_2O_3$ in the original ore, and for interaction with $Fe_2O_3$ as described in co-pending application 104,765 of January 4, 1971, or otherwise. In other cases, where there may be only a small amount, or none, used with $Fe_2O_3$ because of the low iron content of the ore, the $AlCl_3$ may be returned as vapors only to the reduction-chlorination of the $Al_2O_3$.

The mixture of salts is chosen so that sufficient of the chloride of the other metal vaporizes to keep the $AlCl_3$ in the condensate in a liquid solution (since at atmospheric pressure $AlCl_3$ has no liquid state when pure). However, this is not always necessary since the heat taken up by the flash condenser may be removed from the mixture of chlorides by cooling coils immersed in the body or reservoir of the liquid salt mixture or by other well known conventional system instead of by the reflux condenser arrangement which is usually preferred. The liquid melt would not then need to be boiling, but usually it is preferable to boil off an amount of $AlCl_3$ which passes off as vapors from the flash cooler equal to the amount formed in the disproportionation. This passes on directly to an oxidation-chlorination for the chlorination and removal as gaseous chlorides of elements higher in the affinity series, e.g., Fe and Ti, also $H_2$ (from the reductant, or from water present), etc. This aspect of the $AlCl_3$ balance in the operation is discussed in the co-pending Application 103,765 of Jan. 4, 1971.

The Al metal, as the product of the disproportionation, comes as a slurry of fine powder if the liquid mixture of the chlorides boils below 690°, the melting point of Al, or as droplets of Al, if above. In either case, the $AlCl_3$ is vaporized and dried off to pass back to the flash condenser or to the reactor for removing Fe. The chloride of the alkali or alkaline earth metal is separated by melting the aluminum if necessary to withdraw it as liquid. Any of the NaCl or other salts having a boiling point above 660°C, the melting point of the Al, will remain as a small amount of residual impurity which may be removed as a solid mixture and dissolved off with water, recovered for reuse, or discarded.

Thus there have been indicated several functions of the chloride of an alkali or alkaline earth metal added to the $AlCl_3$ in a carefully controlled amount for use in the flash condenser:

a. it keeps the $AlCl_3$ in a liquid phase at atmospheric pressure for use as a spray or otherwise for direct contact-coolant of the hot gases from the reactor;

b. it lowers the effective vapor pressure of the $AlCl_3$ in some cases so that a higher temperature may be used in the flash condenser than the sublimation temperature of $AlCl_3$; or it may increase the effective vapor pressure of $alCl_3$ to give a lower operating temperature, depending on the design and operating characteristics of the particular flash condenser used;

c. it may increase the effective critical temperature of $AlCl_3$ above 354°C;

d. it may allow the condensate of the reflux condenser to be liquid at all times, while pure $AlCl_3$ condensing would solidify on condensation.

This important ability of maintaining the $AlCl_3$ in a liquid phase, which may be used in a direct contact liquid cooler-condenser to separate Al as metal before the disproportionating reaction can reverse, has also been obtained by adding one or more of the chlorides of other metals than the alkali and alkaline earth metals, which metals also are higher than Al in the chlorine affinity series, as indicated above. The $AlCl_3$ and the other metal chloride or chlorides of these other metals in liquid salt mixtures of the spray condenser may be used to remove heat by their effect on vapor pressure and boiling. Some of these chlorides of metals other than the alkali or alkaline earth metals, but also higher than Al in the affinity series may be listed, for example, in the order of their boiling points:

$TiCl_4$, M.P. $-25°C$, B.P. $+136°C$;

$FeCl_3$, M.P. $+300°C$, B.P. $+310°C$;

$ZnCl_2$, M.P. $+283°C$, B.P. $+732°C$;

$PbCl_2$, M.P. $+501°C$, B.P. $+950°C$;

$MnCl_2$, M.P. $+650°C$, B.P. $+1190°C$;

$CuCl$, M.P. $+422°C$, B.P. $+1366°C$.

When chemically united with or physically dissolved in $AlCl_3$, each of these chlorides at different temperatures has different solubilities, and particularly different abilities to change the effective vapor pressure of $AlCl_3$ out of the liquid solution therewith. Besides this liquifying of $AlCl_3$ to enable it to be used in a flash condenser with the change of its effective boiling point, there are other reasons for the choice of any one chloride of a metal above Al in the affinity series; e.g., $TiCl_4$ gives a very low temperature of the flash condenser which may be of importance in some designs; and its use has the advantage that it allows the reflux condenser to operate freely without any risk of condensing $AlCl_3$ as a solid therein.

Particularly $AlCl_3$ has a wide range of miscibilities with the chlorides of Fe, Zn, Mn, and Pb; and thus, solutions of these gives considerable freedom in operation. However, $FeCl_3$ has been found to decompose slowly under the desired operating temperature; and the $FeCl_2$ which is formed sublimes at about its melting point of 670°C.

Most of the chlorides of the alkali and alkaline earth metals and of the other metals higher than Al in the chlorine affinity series have been found to form equimolecular compounds with $AlCl_3$ when mixtures of the halides are melted. Some form compounds, one with a 2 to 1 and one with a 1 to 1 mol ratio. Some examples of the double salt-chloride compounds - and their melting points - which have been found to give usable coolant liquids are: -

$LiCl.AlCl_3$ (144°C); $NaCl.AlCl_3$ (185°C); $CuCl.AlCl_3$ (233°C); $MnCl_2.AlCl_3$ (227°C); $MnCl_2.2AlCl_3$ (184°C). However, these complex salts are soluble in an excess of either of the single components, and an excess of the other chloride than $AlCl_3$ gives the higher melting point which may be desired. Thus, there are wide ranges of solubilities available in choosing the coolant with desired characteristics.

Also many of the pairs of metal chlorides from a simple eutectics in the solid-liquid equilibria. Whether double salts or eutectics, or both, are formed in these molten solutions makes little difference in their use in a flash condenser; however, the solution is chosen so as to have a boiling point in the desired range for a particular design of flash condenser; and a lower melting point is usually desirable, other things being equal, to minimized solidification of the salt mixture in the splash condenser on shut down.

In most cases, when a high boiling chloride is used as the added material to keep the $AlCl_3$ dissolved in a liquid state for use in a splash condenser, the vapors formed due to the cooling of the hot gases from the reaction may be almost completely $AlCl_3$, and if this is the low boiling compound, a very slight amount of rectification will hold down the other salt by condensation and refluxing back to the flash cooler. The appropriate amount of the pure $AlCl_3$ may then be passed to the corresponding reactor for iron removal as described in Co-pending Application No. 103,765 of Jan. 4, 1971. The discharge of Al metal from the flash condenser in a slurry of the mixed molten chlorides is then heated to vaporize the mixed chlorides; and their vapors are passed to the reflux condenser with the return of the condensate to the flash condenser.

Conversely, a low boiling chloride may be used and, as one example, $TiCl_4$ boiling at 136°, also has such a low freezing point that, when an operable amount of $AlCl_3$ is dissolved in it, the flash condenser will not solidify on shut down.

EXAMPLES OF FLASH COOLING BY ALUMINUM HALIDES

I. The hot gas stream coming from a bromination of clay contained AlBr and non-condensible gases. It was passed to a flash cooler, where its temperature was reduced from that of the reactor, approximately 1,600°C, to below 300°C, in less than 5 seconds, while Al and $AlBr_3$ were formed by disproportionation.

The splash condenser was charged and operated with $AlBr_3$ liquid at its atmospheric boiling point of 263°C, with droplets intimately contacting the hot gases containing AlBr which disproportioned on cooling and in solution in the coolant to give Al plus additional $AlBr_3$. Heat from the hot gases boiled the $AlBr_3$, and its vapors and the non-condensible gases passed to a reflux condenser through which the non-condensible gases passed unchanged, as $AlBr_3$ was condensed. An equivalent amount of $AlBr_3$ to that produced in the disproportionation was passed back to the original bromination processing, and a larger amount as coolant was returned to the splash condenser. The $AlBr_3$ was separated by physical means from the aluminum metal product for reuse in the splash condenser, i.e., by decantation and distillation.

II. The hot gas stream coming from a chlorination of a fly ash analyzing 50 percent $Al_2O_3$, contained AlCl and non-condensible gases. The chlorination reaction was operated above 1,500°C and slightly above 3.5 atmospheres pressure; and the flash condenser was operated at approximately 3.5 atmospheres, with $AlCl_3$ liquid boiling therein at about 220°C to remove the heat from the hot gases. $AlCl_3$ vapors formed were passed to a reflux condenser at 3.5 atmospheres pressure. The operation was similar to that of Example I except for the increased pressure and the use of chlorine instead of bromine. III. The process of chlorination by $AlCl_3$ in the presence of coke was operated on an aluminous ore containing also substantial amounts of Fe and Si at substantially one atmosphere pressure throughout, to give a hot gas stream containing AlCl and noncondensible gas, $CO_2$, Co, and/or $Cl_2$. The flash condensation was operated as in Example I excepth that common salt, NaCl, was added to and maintained in the AlCl₃ as a mixed salt melt in the pool of the splash condenser, at a somewhat less than equal molecular ratio, NaCl/AlCl₃. The temperature of the molten salt mixture was thus somewhat above the 185°C melting point of the double-salt compound NaCl.AlCl₃; and the temperature of the flash condenser was maintained between 200°C and 525°C by this addition of NaCl, which reduced the effective vapor pressure, or increased the effective boiling point of AlCl₃ out of the mixed salt bath. A partial condensation in a reflux condenser condensed all of the NaCl and most of the AlCl₃ in the vapors formed due to the heat in the hot gases. Condensate was returned to the splash condenser, from which the Al metal was withdrawn as a slurry in the mixture of molten salts, and separated by physical means; i.e., filtration and evaporation off of the AlCl₃.

The AlCl₃ vapor and the non-condensible gas mixture leaving the reflux condenser passed to the shell side of a final condenser for AlCl₃, and the non-condensible gases were vented. The solid AlCl₃ which formed on the condenser tubes was evaporated off in a later step by steam admitted to the tubes, and the AlCl₃ vapors were passed back to the reaction system, part of these vapors going to chlorinate more alumina and part to chlorinate iron oxide in the original ore.

Chlorination of the iron oxide in the original ore preferentially gave volatile FeCl₃, which was removed, and more Al₂O₃ remaining in the ore. This, with the Al₂O₃ originally present, was then chlorinated by AlCl₃ at a temperature of about 1500°C to give the AlCl in the hot gas to the coolant, thereby completing the AlCl₃-AlCl-AlCl₃ cycle. IV. The processing was the same as in Example III exept that CaCl₂ was added and maintained in sufficient quantity in its mixture with AlCl₃ in the pool of the flash condenser to give a temperature of the liquid there of 700°C. The Al metal was condensed as a liquid and settled to the bottom of the pool of molten salts from which it was withdrawn.

The vapors of the mixed chlorides from the flash condenser with non-condensible gases from the chlorination reaction were handled as in Example II. V. The hot gas stream at one atmosphere pressure coming from a chlorination of clay contained AlCl and non-condensible gases. It was immediately passed to a midpoint of a short, packed section of a distillation and rectification column above a pool charged with a mixture of TiCl₄ and AlCl₃ in a molar ratio selected to give a boiling point of about 300°C. The pool was provided with a heater for reboiling, and the top of the column had a condenser for reflux. Condensate at about 140°C was directed to pass as a thin film over and down the packing, against which the hot gases from the chlorination impinged. The hot gases were immediately cooled to about 300°C with disproportionation of the AlCl. The heat given up vaporized the TiCl₄ and AlCl₃, after rectification and condensation descended as reflux wash in the distilling section. The Al metal produced as a fine powder was carried down in the reflux of mixed salt liquid; and any TiCl₄ which was not distilled out by the heat of the hot gas was vaporized and removed in the lower section of the packed column by the heat supplied to the reboiler to vaporize it from AlCl₃. Solid Al and AlCl₃ were collected in the reboiler. When a charge was obtained, the reboiler was cut off the system, a new reboiler was cut in, and the process continued.

When the first reboiler was cut out, containing no TiCl₄, the AlCl₃ present with the Al was substantially the total amount of (a) that to be recycled to the chlorinating reactor, and (b) that to go to the next stage of the process for removal of iron, etc. Heat to the reboiler was increased, the AlCl₃ present was vaporized and passed to these respective steps of the original processing, and as the temperature increased to above 690°C, the Al metal was melted and then drawn off as product.

It is claimed: 1

1. A process for producing aluminum from an aluminum subhalide having a molecular weight below 107 comprising:
    a. passing said aluminum subhalide in a gas stream at a high temperature between 1,100° and 1,800°C into direct contact with a coolant liquid in dispersed flow, said coolant liquid containing a substantial amount of the normal aluminum halide corresponding to said aluminum subhalide;
    b. flash cooling within not more than 5 seconds, by means of said coolant liquid in dispersed flow, said gas stream from said high temperature between 1100° and 1800°C to a low temperature, below 1,000°C; whereby
    c. said aluminum subhalide disproportions to give aluminum metal and said corresponding normal aluminum halide; and
    d. separating by physical means said corresponding normal aluminum halide and said aluminum metal.

2. In the process according to claim 1 wherein said aluminum subhalide is AlBr; and said normal aluminum halide is AlBr₂.

3. In the process according to claim 1 wherein said aluminum subhalide is AlCl; and said normal aluminum halide is alCl₃.

4. In the process according to claim 1 wherein said aluminum subhalide is AlF; and said normal aluminum halide is AlF₃.

5. In the process according to claim 1, wherein said disproportioning reaction and said flash cooling both take place under superatmospheric pressure.

6. In the process according to claim 1 wherein said hot gases are flash cooled from their high temperature to not more than 700°C by said coolant liquid.

7. In the process according to claim 1 wherein said hot gases are flash cooled from their high temperature to substantially the boiling temperature of said coolant liquid within not more than one second.

8. In the process according to claim 1 wherein the boiling temperature of said coolant liquid is between 136°C and 725°C.

9. In the process according to claim 1 wherin at least part of the heat removed in cooling said hot gas stream is used to boil at least part of said coolant liquid.

10. In the process according to claim 9 wherein the vapors formed in boiling said coolant liquid are condensed at least in part by a reflux condenser which returns at least a part of the condensate so formed to the reservoir pool of said coolant liquid in a flash condenser.

11. In the process according to claim 9 wherein said normal halide is AlCl₃ said subhalide is AlCl; said coolant is a mixture of NaCl and AlCl₃ maintained in a mole ratio to boil while cooling said high temperature gas stream in a flash condenser between 200° and 325°C and give vapors of said NaCl and said $AlCl_3$, substantially all of said wapors of NaCl and at least part of said vapors of $AlCl_3$ being condensed in a reflux condenser to give a condensate which is passed, at least in part, back to said flash condenser.

12. In the process according to claim 1 wherein said coolant liquid contains together with said normal aluminum halide, an added halide of a metal higher than aluminum in the corresponding halogen affinity series.

13. In the process according to claim 12 wherein said added halide forms a double salt with said normal aluminum halide contained in said coolant liquid.

14. In the process according to claim 13 wherein said double salt is in a liquid solution with said normal aluminum halide during said flash cooling.

15. In the process according to claim 13 ehrein said normal halide is $AlCl_3$, said subhalide is AlCl, and said added halide is NaCl.

16. In the process according to claim 14 wherein said normal halide is $AlCl_3$, said subhalide is AlCl and said added halide is $MnCl_2$.

17. In the process according to claim 12 wherein said coolant liquid containing said added halide and said normal aluminum halide has a lower vapor pressure and a higher vaporizing temperature than that of said normal aluminum halide.

18. In the process according to claim 12 whrein said coolant liquid containing said added halide and said normal aluminum halide has a higher vapor pressure and a lower vaporizing temperature than that of said normal aluminum halide.

19. In the process according to claim 18 wherein said normal halide is $AlCl_3$, said subhalide is AlCl and said added halide is $TiCl_4$; heat removed from said hot gases boils said coolant liquid to give vapors; said vapors are passed through a distillation zone to a reflux condenser wherein the mole ratio of $TiCl_4$ to $AlCl_3$ is the highest in the process; condensate from said relux condenser passes in dispersed flow back through said distillation zone as coolant liquid; said hot gases contact said condensate in said dispersed flow at an intermediary point in said distillation zone; the mole ratio of $TiCl_4$ to $AlCl_3$ in the coolant liquid is low at the bottom of said distillation zone; and at said bottom of said distillation zone said coolant liquid with said aluminum produced is accumulated in a slurry, said aluminum being subsequently separated from said slurry by physical means.

20. In the process according to claim 19 wherein said hot gas stream comes from the chlorination of alumina originally present in an ore and said $TiCl_4$ comes from titania present in said ore, said titania having been chlorinated by $AlCl_3$, and said $TiCl_4$ so formed having been recycled to form in solution a part of said coolant liquid.

21. In the process according to claim 1 wherein said hot gas stream comes from the halogenation of aluminum oxide originally present in an ore; and at least a part of said normal aluminum halide in said coolant liquid separated from said aluminum produced is returned to halogenate said aluminum oxide in said ore.

22. In the process according to claim 21 wherein said ore also contains an iron oxide; and at least a part of said normal aluminum halide in said coolant liquid separated from said aluminum produced is passed to halogenate preferentially said iron oxide in said ore to an iron halide, thereby producing aluminum oxide from the aluminum in said aluminum halide.

23. In the process according to claim 22 wherein said aluminum oxide, produced by halogenating preferentially said iron oxide in said ore by at least a part of said normal aluminum halide separated from said aluminum, is subsequently halogenated at a higher temperature together with said aluminum oxide originally present in said ore by another part of said normal aluminum halide in said coolant liquid, separated from said aluminum produced.

24. In the process according to claim 23 wherein said normal halide as $AlCl_3$ and said normal halide is AlCl.

25. In the process according to claim 1 wherein at least part of the heat removed from said hot gas stream by said coolant liquid is removed from said coolant liquid by cooling coils immersed in a reservoir thereof, said cooling coils being supplied with a secondary coolant fluid.

* * * * *